(12) United States Patent
Vanderveen et al.

(10) Patent No.: US 6,702,061 B2
(45) Date of Patent: Mar. 9, 2004

(54) ENVIRONMENTALLY PROTECTED MICROPHONE FOR AN ACTIVE NOISE CONTROL SYSTEM

(75) Inventors: James Kenneth Vanderveen, Blenheim (CA); Roy Haworth, London (GB)

(73) Assignee: Siemens VDO Automotive, Inc., Chatham (CA)

( * ) Notice: Subject to any disclaimer, the term of this patent is extended or adjusted under 35 U.S.C. 154(b) by 0 days.

(21) Appl. No.: 10/056,322

(22) Filed: Jan. 24, 2002

(65) Prior Publication Data

US 2002/0129990 A1 Sep. 19, 2002

Related U.S. Application Data

(60) Provisional application No. 60/276,224, filed on Mar. 15, 2001.

(51) Int. Cl.$^7$ .............................................. F02M 35/12
(52) U.S. Cl. .................... 181/224; 181/206; 181/205; 381/71.1; 381/71.5; 381/71.4; 381/71.7
(58) Field of Search ................................ 181/242, 205, 181/206, 224; 381/71.8–71.14, 355, 359, 365, 189

(56) References Cited

U.S. PATENT DOCUMENTS

| | | | |
|---|---|---|---|
| 2,232,380 A | * | 2/1941 | Giannini .................... 381/163 |
| 3,936,606 A | | 2/1976 | Wanke |
| 4,410,065 A | | 10/1983 | Harvey |
| 4,600,077 A | * | 7/1986 | Drever ........................ 181/242 |
| 4,607,145 A | * | 8/1986 | Ravinet et al. .............. 381/190 |
| 4,665,549 A | | 5/1987 | Eriksson et al. |
| 4,817,164 A | * | 3/1989 | Bertignoll et al. .......... 381/189 |
| 4,876,722 A | | 10/1989 | Dekker et al. |
| 4,947,434 A | | 8/1990 | Ito |
| 4,966,252 A | * | 10/1990 | Drever ........................ 181/158 |
| 5,170,019 A | | 12/1992 | Lee |
| 5,229,556 A | | 7/1993 | Geddes |
| 5,319,165 A | | 6/1994 | Geddes |
| 5,336,856 A | | 8/1994 | Krider et al. |
| 5,426,703 A | | 6/1995 | Hamabo et al. |
| 5,426,705 A | | 6/1995 | Yokota et al. |
| 5,432,857 A | | 7/1995 | Geddes |
| 5,446,249 A | | 8/1995 | Goodman et al. |
| 5,446,790 A | | 8/1995 | Tanaka et al. |
| 5,455,869 A | * | 10/1995 | Miscavige .................... 381/364 |
| 5,457,749 A | | 10/1995 | Cain et al. |
| 5,466,899 A | | 11/1995 | Geisenberger |
| 5,513,266 A | | 4/1996 | Zuroski |
| 5,541,373 A | | 7/1996 | Cheng |
| 5,550,334 A | | 8/1996 | Langley |
| 5,587,563 A | | 12/1996 | Yazici et al. |
| 5,647,314 A | | 7/1997 | Matsumura et al. |
| 5,693,918 A | | 12/1997 | Bremigan et al. |
| 5,808,243 A | * | 9/1998 | McCormick et al. ........ 181/0.5 |
| 5,828,759 A | | 10/1998 | Everingham |
| 6,072,880 A | * | 6/2000 | Shipps et al. ............... 381/71.5 |
| 6,084,971 A | | 7/2000 | McLean |
| 6,118,878 A | | 9/2000 | Jones |
| 6,381,337 B1 | * | 4/2002 | Greenberg ................... 381/345 |

FOREIGN PATENT DOCUMENTS

| | | |
|---|---|---|
| EP | 0 674 097 A1 | 9/1995 |
| EP | 0 827 134 A2 | 3/1998 |
| EP | 0884471 | 6/1998 |
| EP | 0 884 471 A | 12/1998 |
| JP | 11 007287 A | 1/1999 |

OTHER PUBLICATIONS

European Search Report, dated May 30, 2003.

* cited by examiner

Primary Examiner—Robert Nappi
Assistant Examiner—David S Warren

(57) ABSTRACT

An air introduction system (10) includes an active noise control system (22) having an environmentally protected microphone (24). A microphone support structure (26) defines a louvered cage (38) over a microphone reception cavity (40). The microphone (24) is mounted to a circuit board (42) which fits within the microphone reception cavity (40). A cover (42) fits into the cavity (40) to encase the microphone (24) therein. An open cell foam (60) surround the microphone (24) and a waterproof material (58) encases the foam (60). The waterproof material (58) includes an excess of material such that waterproof material provides for internal air expansion and contraction. By locating the foam (60) between the microphone (24) and the waterproof material (58) improved transmission of acoustic waves is provided which thereby maintains microphone sensitivity.

21 Claims, 5 Drawing Sheets

ENVIRONMENTALLY PROTECTED MICROPHONE FOR AN ACTIVE NOISE CONTROL SYSTEM

The present application claims priority to U.S. Provisional Patent Application Serial No. 60/276,224, filed 15 Mar. 2001.

BACKGROUND OF THE INVENTION

The present invention relates to an air introduction system, and more particularly to an active noise control microphone which is hardened against a hostile environment.

Manufacturers have employed active and passive methods to reduce engine noise within the passenger compartment. Such noise frequently emanates from the engine, travels through the air induction system and emanates into the passenger compartment.

Active systems use a speaker to create a canceling sound that attenuates engine noise. The sound created is out of phase with the engine noise and combines with this noise to result in its reduction. Generally, this sound is generated in proximity to the inlet of the air induction system. In one such system, a control unit, such as a digital signal processor, obtains data from the vehicle engine, creates a predictive model of engine noise, and thereby generates the appropriate cancellation signal based on the results of this model. This signal is then transmitted to the speaker, which transforms the signal into a canceling sound. Because the control unit may not perfectly model engine noise, an error microphone is placed in proximity to the intake of the air induction system to determine if engine noise need be further attenuated.

Typically, the error microphone and speaker are mounted to the air induction system. During vehicle operation the microphone may be subject to damage caused by weathering including snow, mud, ice, stones, leaves insects, and other environmental conditions. To move the microphone may cause the noise attenuation system to function less than optimally.

Accordingly, it is desirable to provide a mounting arrangement for an active noise control microphone which hardens the microphone against environmental conditions.

SUMMARY OF THE INVENTION

The air introduction system according to the present invention provides an active noise control system which includes an environmentally protected microphone. A support structure defines a louvered cage over a microphone reception cavity. The microphone is mounted to a circuit board which fits within the microphone reception cavity. The louvered cage is formed by the support structure to protect the microphone from relatively large debris such as rocks and the like. A cover fits into the cavity opposite the louvered cage to encase the microphone therein. A seal such as an O-ring assures the cover waterproofs the cavity.

An open cell foam surrounds the microphone and a waterproof material encases the foam. The waterproof material encases the foam with an excess amount of material such that waterproof material provides for internal air expansion and contraction. Applicant has determined that by locating the foam between the microphone and the waterproof material improved transmission of acoustic waves is provided which thereby maintains microphone sensitivity.

The present invention therefore provides a mounting arrangement for an active noise control microphone which hardens the microphone against environmental conditions.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
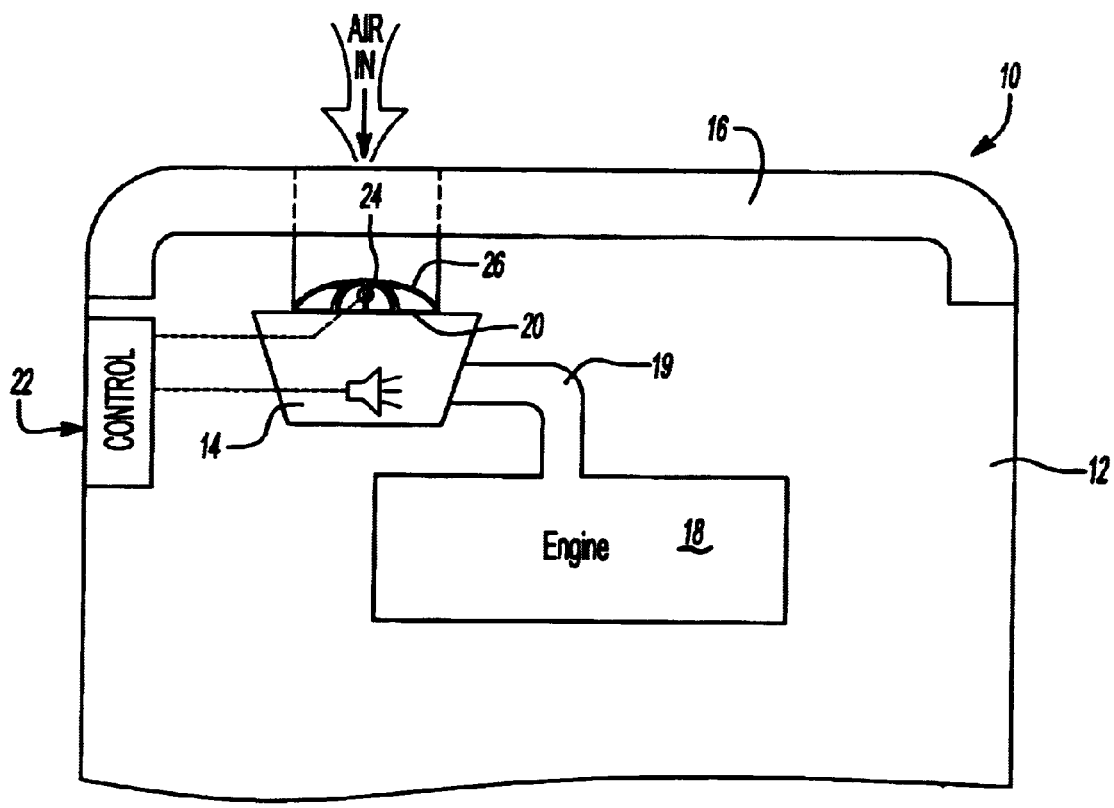
FIG. 1 is a general schematic view of an air introduction system according to the present invention.

FIG. 1 illustrates a general schematic view of an air introduction system 10 for a vehicle (illustrated schematically at 12). Preferably, the air introduction system 10 includes an air introduction body 14 mounted adjacent a vehicle body component 16 such as a vehicle bumper. The air introduction body 14 intakes ambient air to communicate airflow to an engine 18 through a duct 19. As known, noise and vibration from the engine 18 emanates through the air introduction system 10.

The air introduction body 14 includes an inlet 20. An active noise control system 22 is provided to minimize engine noise which is radiated through the air introduction system 10. The active noise control system 22 preferably includes a microphone 24 mounted to a support structure 26. Support structure 26 is operatively connected to the air introduction body 14 adjacent to the inlet 20. The support structure 26 is designed to be relatively acoustically transparent to avoid interference with low frequency sound waves. Acoustic transparency is accomplished by ensuring that the support structure 26 does not itself create a pressure barrier during operation of the system. The support structure 26 spaces the microphone 24 a predetermined distance from the inlet 20 to ensure proper sound reception.

Figure 2:
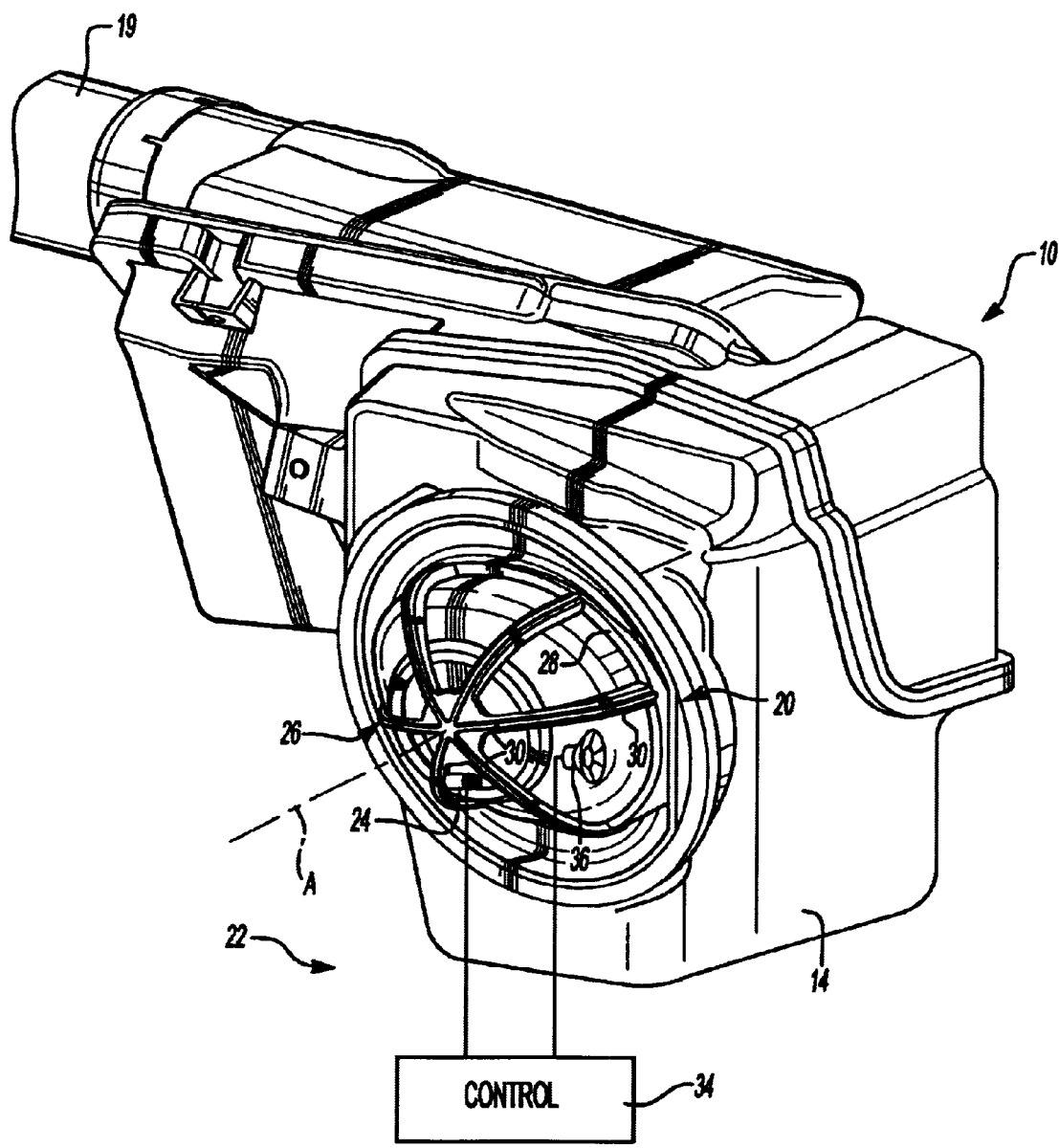
FIG. 2 is a front perspective view of an air introduction body having an active noise control microphone assembly attached thereto.
Figure 3:
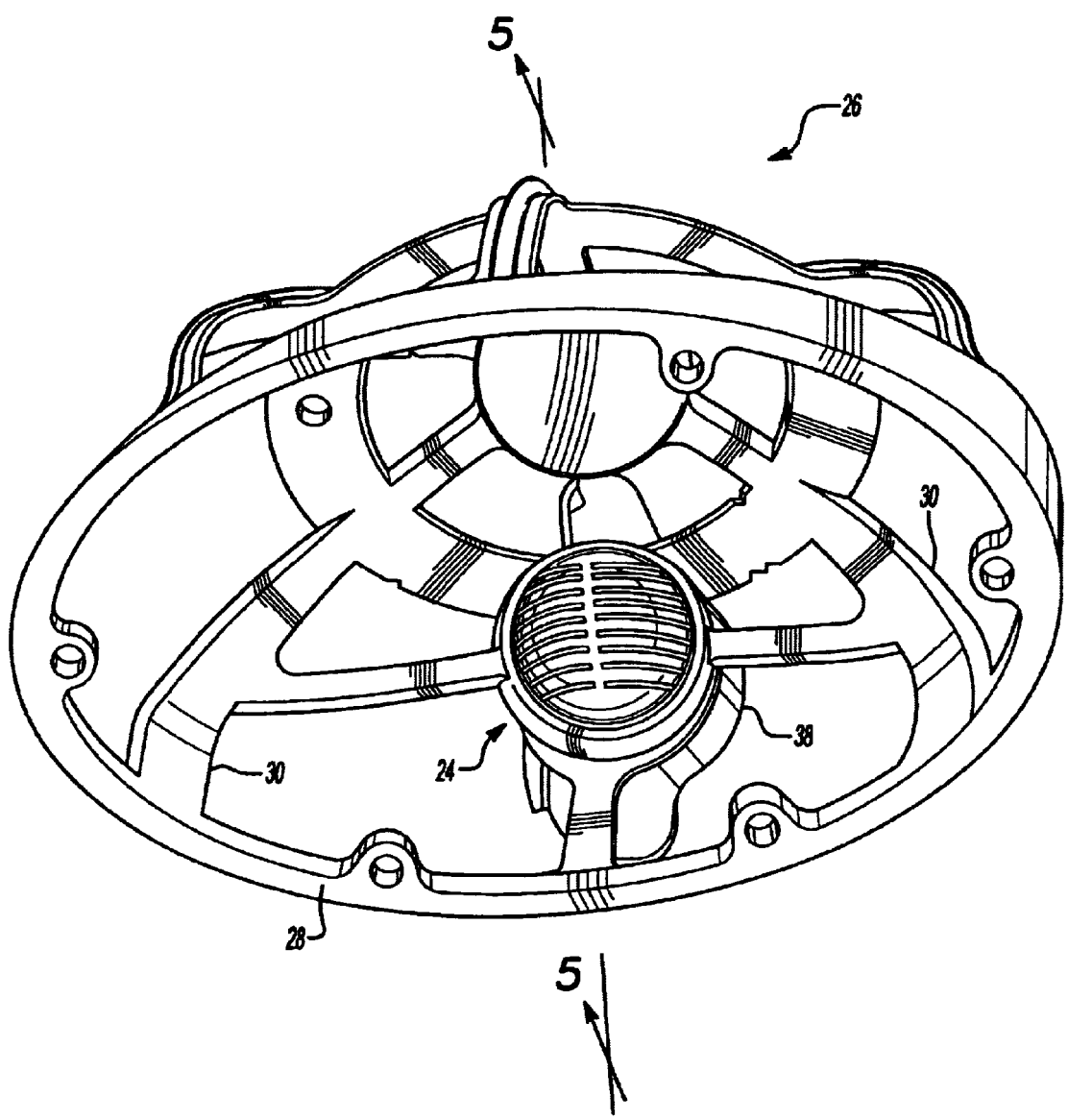
FIG. 3 is a general perspective view of the active noise control microphone mounted to a support structure.

Referring to FIG. 2, the support structure 26 is preferably of a substantially hemispherical basket like shape. The support structure includes a support ring 28 having a plurality of hemispherical longitudinal members 30 extending therefrom. The support ring 28 mounts about the inlet 20. One or more latitudinal rings 32 further interconnect the longitudinal members 30 to provide additional rigidity. Preferably, the microphone 24 is mounted between two the longitudinal members 30 (FIG. 3) such that the microphone is mounted off the center of intake 20 to ensure complete reception of sound. The support structure 26 provides for airflow therethrough to place the microphone 24 in a preferred reception area such that a controller 34 and speaker 36 of the active noise control system 22 effectively counteracts undesirable noise as generally known.

Locating the microphone adjacent the inlet 20, particularly within a forward facing body component 16 (FIG. 1) locates the microphone 24 in an environmentally hostile location. The present invention advantageously protects the microphone from such an environment while minimizing undesirable attenuation thereof.

Figure 4:
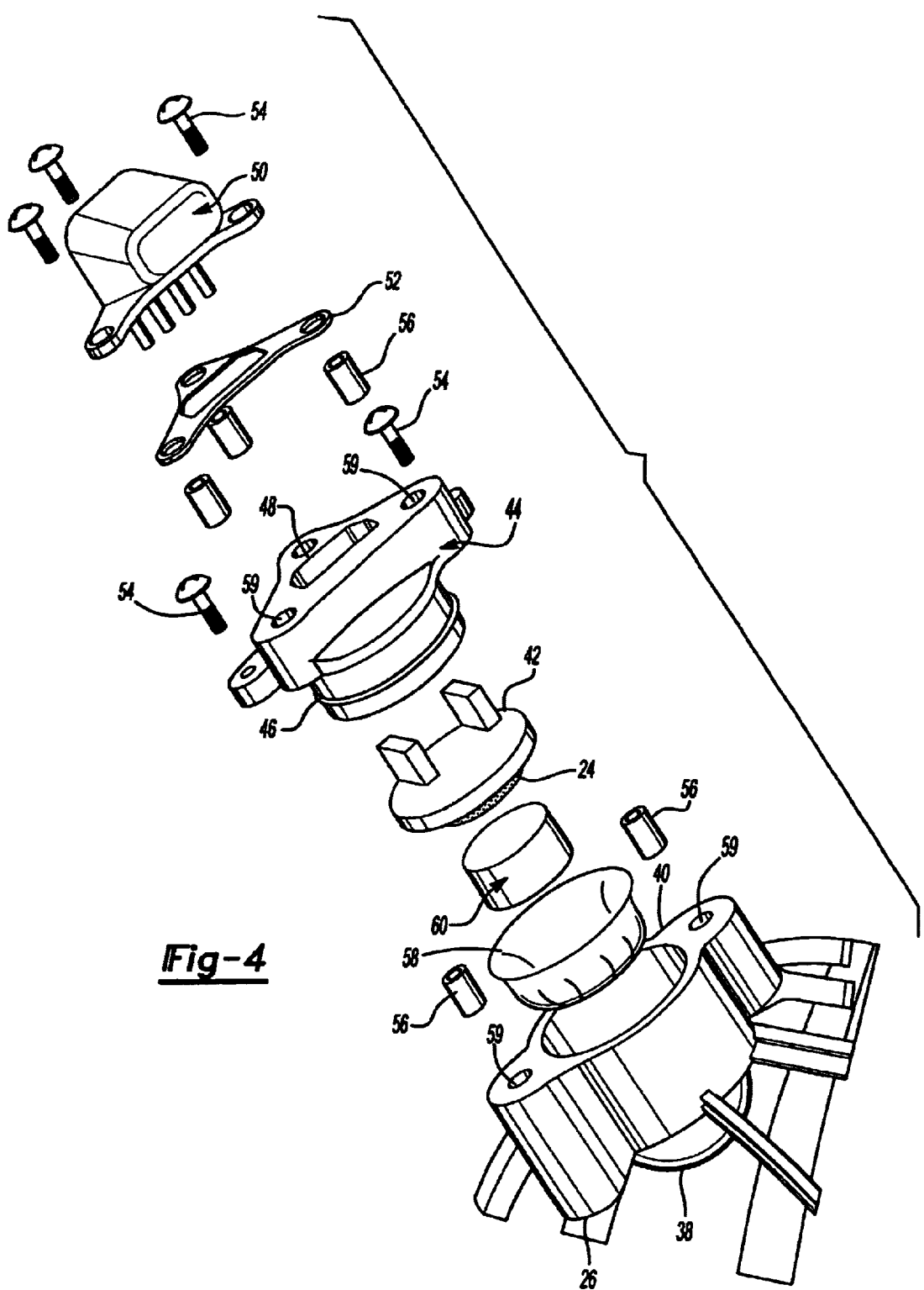
FIG. 4 is an exploded view of view of the active noise control microphone.

Referring to FIG. 4, an exploded view of the support structure 26 is illustrated. The support structure 26 defines a louvered cage 38 (also illustrated in FIG. 3) over a microphone reception cavity 40. The louvered cage 38 is preferably integrally formed with the support structure to protect the microphone from relatively large debris such as rocks and the like.

The microphone 24 is preferably mounted to a circuit board 42 which fits within the microphone reception cavity 40. The circuit board 42 preferably includes the control electronics for the microphone 24 such as a preamp and may alternatively or additionally include other active noise control system components. A cover 44 fits into the cavity 40 to encase the microphone 24 therein. A seal 46 such as an O-ring or the like assures the cover 44 waterproofs the cavity 40 opposite the louvered cage 38.

The cover 44 preferably includes an aperture 48 to receive a connector 50 which communicates with the circuit board 42. The connector 50 provides for signal communication with the controller 34 (FIG. 2). It should be understood that other connectors including wires directly soldered to the circuit board 42 will also benefit from the present invention. A seal 52 such as a gasket further assures a waterproof seal is maintained between the cover 44 and the connector 50.

Threaded fasteners 54 mount the cover 44 to the support structure 26 and the connector 50 with the cover 44. Metallic threaded inserts 56 are frictionally located within apertures 58 of the non-metallic support structure 26 and cover 44 to provide for repeated reception of the threaded fasteners. Assembly and disassembly is thereby more readily achieved.

To waterproof the louvered cage 38 (also illustrated in FIG. 3) and protect the microphone 24 adjacent thereto, a waterproof material 58 such as a polyethylene film surround the microphone 24. Other thin films such as Sympatex will also benefit from the present invention. An open cell foam 60 preferably surround the microphone 24 and the waterproof material 58 encases the foam 60. Applicant has determined that by locating the foam 60 between the microphone 24 and the waterproof material 58, improved transmission of acoustic waves is provided which thereby maintains microphone sensitivity.

Figure 5:
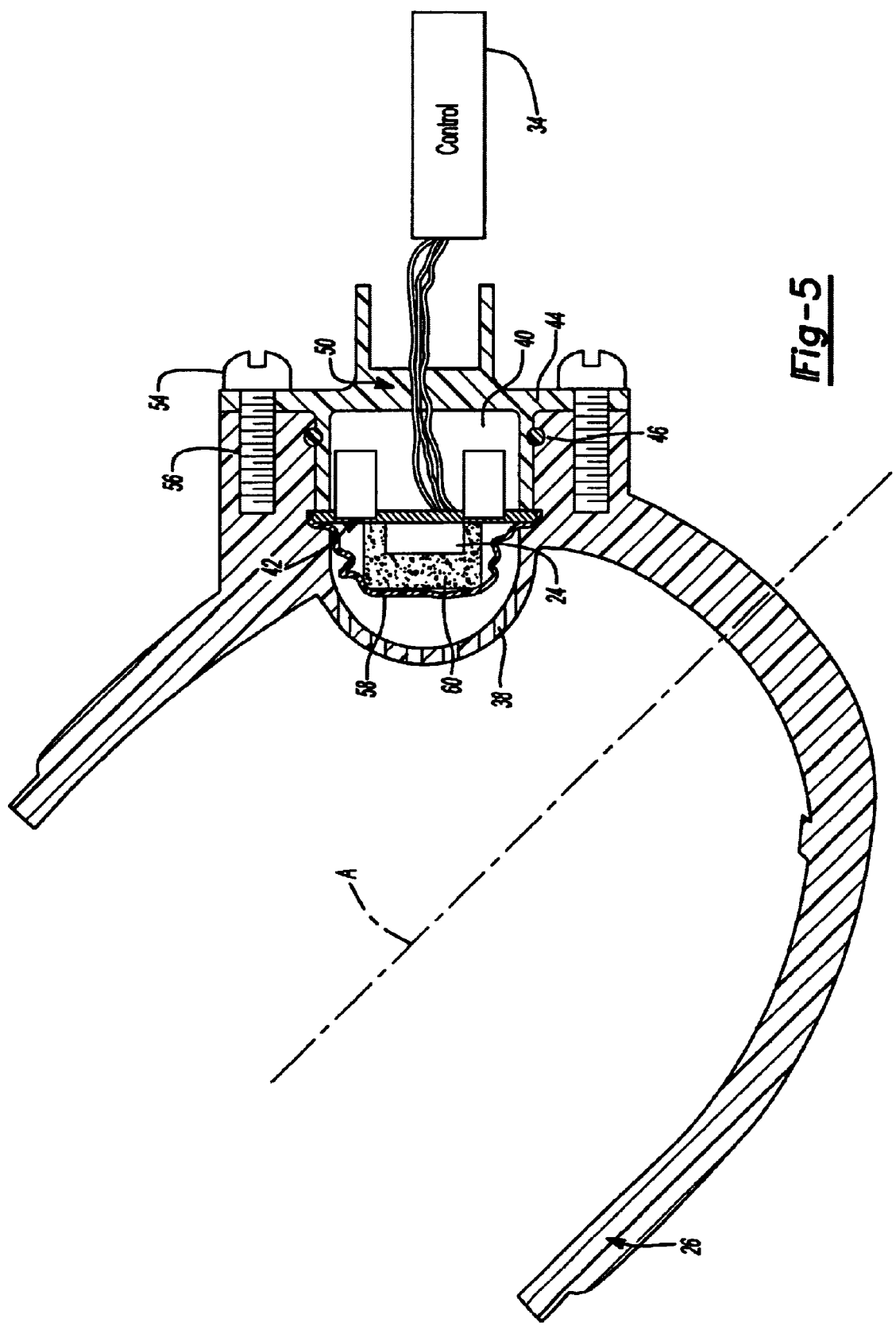
FIG. 5 is a sectional view of the view of the active noise control microphone mounted to the support structure.

Referring to FIG. 5, the waterproof material 58 is preferably attached to the foam 60 and the circuit board 42. The waterproof material 58 encases the foam 60 and also provides an excess amount of material such that waterproof material 58 provides for internal air expansion and contraction. Preferably, the microphone 24 is mounted between two the longitudinal members 30 (FIG. 3) such that the microphone is mounted off a centerline axis A of the support structure 26.

Alternatively, or in addition, a spray on waterproof coating maybe directly applied to the foam 60, thereby avoiding the need for waterproof material 58.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An active noise control microphone assembly comprising:
   a vehicle introduction body;
   a hemi-spherical support structure mounted adjacent said vehicle air introduction body said hemi-spherical support defining a central axis;
   a microphone mounted to said support structure offset from said central axis; and
   a waterproof material protecting said microphone.

2. The active noise control microphone assembly as recited in claim 1, further comprising a louvered cage for protecting said microphone.

3. The active noise control microphone assembly as recited in claim 1, wherein said waterproof material includes a polyethylene film.

4. The active noise control microphone assembly as recited in claim 1, further comprising an open cell foam for protecting said microphone.

5. The active noise control microphone assembly as recited in claim 4, wherein said waterproof material encases said open cell form.

6. The active noise control microphone assembly as recited in claim 1, wherein said waterproof material includes excess material such that said waterproof material provides for internal air expansion and contraction.

7. The active noise control microphone assembly as recited in claim 1, further comprising an open cell foam for protecting said microphone, said waterproof material covering said open cell foam.

8. The active noise control microphone assembly as recited in claim 1, wherein said support structure is a hemi-spherical basket-like shape.

9. The active noise control microphone assembly as recited in claim 8, wherein said support structure surrounds an inlet to said air introduction body.

10. The active noise control microphone assembly as recited in claim 1, wherein said microphone is offset from a center of said support structure.

11. The active noise control microphone assembly as recited in claim 1, wherein said microphone is mounted to a circuit board supported by said support structure.

12. The active noise control microphone assembly as recited in claim 11, further comprising an open cell foam for protecting said microphone mounted to said circuit board.

13. The active noise control microphone assembly as recited in claim 12, further comprising a polyethylene film mounted to said circuit board to protect said open cell foam.

14. The active noise control microphone assembly us recited in claim 1, wherein said vehicle air introduction body is located adjacent a front bumper.

15. An air introduction system comprising:
   a vehicle air introduction body;
   a support structure mounted adjacent said vehicle air introduction body and defining central axis, said support structure forming a louvered cage offset from said central axis;
   a microphone mounted to a circuit board, said circuit board mounted to said support structure adjacent said louvered cage;
   an open cell foam mounted to said circuit board and substantially surrounding said microphone; and
   a waterproof material mounted to said circuit board and substantially surrounding said open cell foam.

16. The air introduction system as recited in claim 15, wherein said waterproof material includes a polyethylene film.

17. The air introduction system as recited in claim 15, wherein said waterproof material includes excess material such that said waterproof material provides for internal air expansion and contraction.

18. The air introduction system as recited in claim 15, wherein said support structure is a head-spherical basket-like shape.

19. The air introduction system as recited in claim 15, further comprising a vehicle bumper, said air introduction body mounted adjacent said vehicle bumper.

20. The air introduction system as recited in claim 15, wherein said louvered cage is mounted adjacent a longitudinal member of said hemi-spherical support structure.

21. The air introduction system as recited in claim 15, wherein said vehicle air introduction body is located adjacent a front bumper.

* * * * *